Jan. 19, 1960     F. W. WITTE     2,922,111
COUPLING MECHANISM

Filed March 30, 1956                          2 Sheets-Sheet 1

WITNESSES

INVENTOR
Frederick W. Witte
BY
ATTORNEY

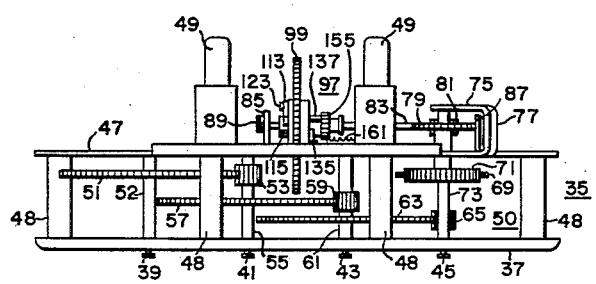
Fig.3.
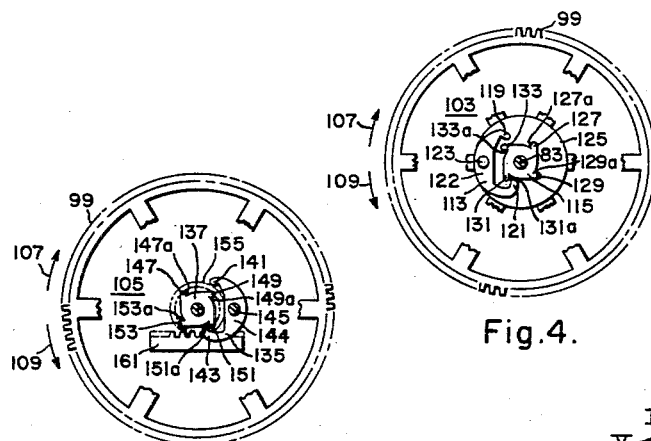
Fig.4.
Fig.5.
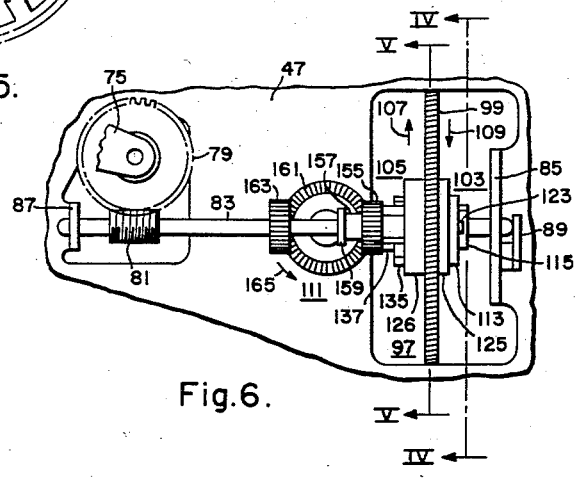
Fig.6.

United States Patent Office 2,922,111
Patented Jan. 19, 1960

2,922,111

COUPLING MECHANISM

Frederick W. Witte, Union, N.J., assignor to Westinghouse Electric Corporation, East Pittsburgh, Pa., a corporation of Pennsylvania Application March 30, 1956, Serial No. 575,226

5 Claims. (Cl. 324—137)

This invention relates to coupling mechanisms and has particular relation to coupling mechanisms for converting bidirectional rotational movement of a driving member into unidirectional rotational movement of a driven member.

According to the present invention a coupling mechanism of improved construction is provided for converting bidirectional rotation of a driving shaft into unidirectional rotation of a driven shaft. The invention is of particular advantage when employed in connection with integrating devices such as watt-hour meters. For this reason the invention will be described in connection with such meters although the invention has numerous other applications.

Watt-hour meters ordinarily include an electromagnetic structure which is energizable in accordance with voltage and current of an electrical circuit to establish a shifting magnetic field having a strength proportional to power of the circuit. A suitable electroconductive armature is mounted for rotation relative to the structure under the influence of the magnetic field in accordance with energy of the circuit. The meter further includes a register device which is operable for providing an indication of the number of revolutions of the armature. For this purpose the register device is coupled to the armature by suitable coupling mechanism effective to operate the register device in accordance with rotation of the armature.

In certain meters the coupling mechanism is arranged to operate the register device such that the direction of registration is dependent upon the direction of rotation of the armature. With such meters if the direction of rotation of the armature is reversed from the normal direction effective to produce a true registration, then the registration provided prior to such reversal is reduced in accordance with such reversed rotation. In order to prevent such false registrations coupling mechanisms have heretofore been provided for coupling the register device to the armature for providing a true registration in response to bidirectional rotation of the armature.

It has been observed that coupling mechanisms heretofore constructed for such purposes exhibit undesirable friction characteristics which result in the imposition of a considerable burden upon the driving member. This is particularly disadvantageous in connection with energy measurement inasmuch as the presence of a burden upon the armature may result in an inaccurate registration of energy. Furthermore, such coupling mechanisms have included a considerable number of parts resulting in time consuming and difficult assembly operations.

In a preferred embodiment of the invention the coupling mechanism includes a pair of pawl and ratchet wheel assemblies carried by a driven shaft from which the register is operated for actuation in response to rotation of a driving shaft which supports the armature. For rotation of the armature in one direction the pawl and ratchet wheel of one assembly are in driving engagement for rotation in a common direction to effect rotation of the driven member in the desired direction. At the same time, the pawl and ratchet wheel of the other assembly rotate relative to each other so as to be ineffective to rotate the driven member. For rotation of the armature in the reversed direction the pawl and ratchet wheel of the other assembly are in driving engagement to effect rotation of the driven member in the same desired direction through a suitable transfer mechanism. Simultaneously, the pawl and ratchet wheel of the one assembly rotate relative to each other so as to be ineffective to rotate the driven member.

The pawl members of the two assemblies are configured and mounted according to the invention such that negligible friction results from relative rotation between the associated pawl and ratchet wheel. For this purpose each of the pawls is mounted for pivotal movement about an axis such that the end portions of each pawl extend toward the ratchet wheels free for engagement with the ratchet teeth. This arrangement results in the imposition of a minimum burden upon the armature thereby assuring an accurate registration of energy.

It is therefore, an object of the invention to provide a coupling mechanism of improved construction for converting bidirectional rotation of a driving member into unidirectional rotation of a driven member.

It is another object of the invention to provide a coupling mechanism for converting bidirectional rotation of a driving member into unidirectional rotation of a driven member which includes a pair of pawl and ratchet assemblies of improved construction.

It is a further object of the invention to provide a watt-hour meter including a register device and an armature with a coupling mechanism of improved construction coupling the register device to the armature for permitting unidirectional registration of the register device in response to bidirectional rotation of the armature.

It is still another object of the invention to provide a watt-hour meter including a register device and an armature with coupling mechanism for coupling the register device to the armature which is constructed so as to impose a negligible burden upon the armature.

Other objects of the invention will become apparent from the following description taken in conjunction with the accompanying drawing, in which:

Fig. 3 is a view in top elevation of the register device and coupling mechanism of the meter of Fig. 1;

Fig. 4 is a view taken along the line IV—IV of Fig. 6 with parts broken away;

Fig. 5 is a view taken along the line V—V of Fig. 6 with parts removed and parts broken away, and Fig. 6 is a view in rear elevation of the parts of Fig. 3 with portions removed.

Figure 1:
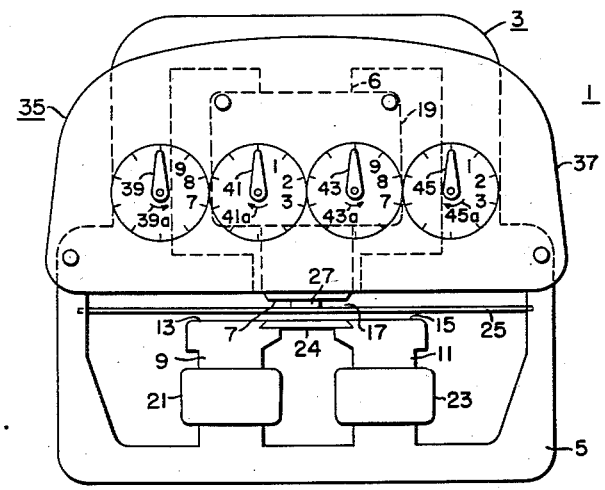
Figure 1 is a view in front elevation of a watt-hour meter embodying the teachings of the invention.

Referring to the drawings, there is illustrated in Fig. 1 a device represented generally by the numeral 1 embodying the teachings of the invention. Although the invention may be applied to numerous devices, it will be assumed for purposes of description that the device 1 is in the form of a watt-hour meter for measuring the energy of an electrical circuit (not shown).

As shown in Fig. 1 the meter 1 includes a magnetic structure 3 which may be formed of any suitable magnetic material. The structure 3 preferably comprises a plurality of magnetic laminations 5 configured to form a voltage magnetic pole 6 having a pole face 7 and a pair of spaced current magnetic poles 9 and 11 having respectively pole faces 13 and 15. The pole faces 13 and 15 lie in a common plane which is spaced from the plane of the pole face 7 to define an air gap 17.

In order to permit energization of the structure 3 the pole 6 has a voltage winding 19 and the poles 9 and 11 have respectively current windings 21 and 23. The winding 19 is effective when energized from the circuit (not shown) to produce an alternating voltage magnetic flux which cooperates with an alternating current magnetic flux produced in response to energization of the windings 21 and 23 from the circuit (not shown) to establish a shifting magnetic field in the air gap 17. A suitable magnetic shunt device 24 is shown positioned between the current poles 9 and 11 for the purpose of compensating for overload conditions as is understood in the art.

Figure 2:
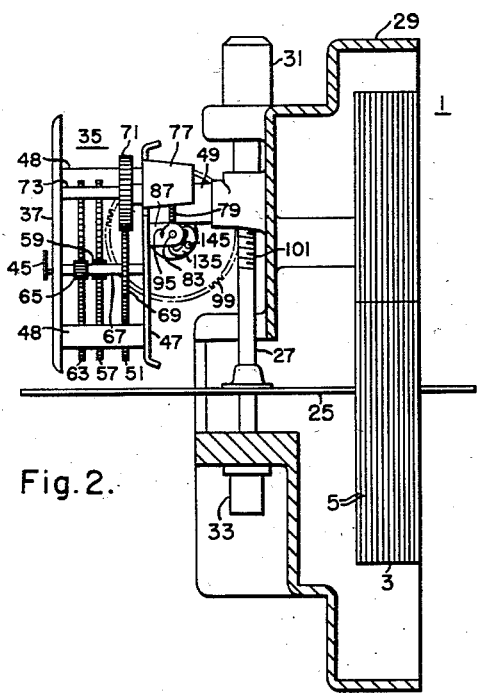
Fig. 2 is a view in side elevation of the meter of Fig. 1 with parts shown in section.

In order to produce a response representative of energy of the circuit (not shown) the meter 1 includes an electroconductive armature preferably in the form of a disk 25 which is secured to a driving shaft 27. As shown in Fig. 2, the meter 1 includes a frame member 29 for supporting certain operating parts of the meter. As there shown, the frame member 29 supports the magnetic structure 3 and also the shaft 27 by means of suitable upper and lower bearing assemblies 31 and 33. The assemblies 31 and 33 are carried by the frame member 29 to mount the disk 25 for rotation relative to the structure 3 about the axis of the shaft 27 through the air gap 17 under the influence of the shifting magnetic field.

In order to provide an indication of the number of revolutions of the disk 25 the meter 1 further includes a register device 35 which is supported by the frame member 29 at the front area of the meter when the meter is in an operative position. The register device includes a dial plate 37 over which a plurality of pointers 39, 41, 43 and 45 pass in response to actuation thereof as shown in Fig. 1. The numbers indicated by the several pointers when read from left to right in Fig. 1 provide a numeral which is representative of the energy measured by the meter 1. For example, the pointer 39 indicates the thousands digit of the numeral, the pointer 41 the hundreds digit of the numeral, the pointer 43 the tens digit of the numeral and the pointer 45 the units digit of the numeral. The register device 35 includes further a plate 47 which is spaced from the plate 37 in a plane parallel to the plane of the plate 37 by means of a plurality of spacer members 48 as shown in Fig. 3. The register device is conveniently detachably secured to the frame member 29 by a pair of spaced projections 49 carried by the plate 47 which extend into spaced openings (not shown) of the frame member. The projections 49 may be secured within the openings (not shown) by set screws (not shown) which are releasably carried by the frame member.

In order to permit actuation of the several pointers in the proper relationship the register device includes a gear train represented generally by the numeral 50 which is positioned between the plates 37 and 47 as best shown in Fig. 3. As there shown, the gear train 50 includes a gear 51 fixed to a shaft 52 which is mounted by the plates 37 and 47 for rotation and which also carries the pointer 39. The gear 51 is in meshing engagement with a gear 53 fixed to a shaft 55 which is mounted by the plates 37 and 47 for rotation and which also supports the pointer 41. The gears 51 and 53 are proportioned such that for each revolution of the gear 53 the gear 51 is rotated through one-tenth of a revolution. A gear 57 is also fixed to the shaft 55 which is in meshing engagement with a gear 59 fixed to a shaft 61 which is mounted by the plates 37 and 47 for rotation and which also carries the pointer 43. The gears 57 and 59 are proportioned such that for each revolution of the gear 59 the gear 57 is rotated through one-tenth of a revolution. A gear 63 is also fixed to the shaft 61 in meshing engagement with a gear 65 fixed to a shaft 67 which is shown in Fig. 2. The shaft 67 is mounted by the plates 37 and 47 for rotation and also supports the pointer 45. The gears 63 and 65 are proportioned so that for each revolution of the gear 65 the gear 63 is rotated through one-tenth of a revolution.

As shown in Fig. 2, the shaft 67 also has fixed thereto a gear 69 which is in meshing engagement with a gear 71 fixed to a shaft 73. As best shown in Fig. 3, the shaft 73 is rotatably mounted by the plate 37 and by a portion 75 of a bracket 77 which may be punched out of the plate 47. A suitable worm 79 is also fixed to the shaft 73 in meshing engagement with a worm 81 which is fixed to a driven shaft 83. The shaft 83 is supported for rotation by a pair of spaced projections 85 and 87 of the plate 47 as best shown in Fig. 3. The projection 85 may include a suitable stop portion 89 for preventing substantial axial movement of the shaft 83.

In order to permit actuation of the several pointers in accordance with rotation of the disk 25, suitable coupling means are provided for coupling the driven shaft 83 for rotation from the driving shaft 27. If such coupling means were designed to effect rotation of the shaft 83 in a direction dependent upon the direction of rotation of the disk 25, a false registration might possibly result due to reversals in the direction of rotation of the disk. This may be explained by considering that if the shaft 83 is rotated in the direction of the arrow 95 of Fig. 2 the pointers 39, 41, 43 and 45 are rotated respectively in directions indicated by the associated arrows 39a, 41a, 43a and 45a of Fig. 1 through the gear train 50. Such rotation of the several pointers is effective to provide a true registration of the register device. However, if the shaft 83 is rotated in a direction opposite to the direction indicated by the arrow 95, then the several pointers will be rotated in directions opposite to directions indicated by the associated arrows to provide a false registration.

In order to prevent a false registration, suitable coupling means represented generally by the numeral 97 are provided according to the invention for effecting unidirectional rotation of the shaft 83 in the direction effective to provide a true registration in response to bidirectional rotation of the disk 25. As shown in Fig. 2, the coupling mechanism 97 includes a worm gear 99 which is loosely mounted on the shaft 83 so as to permit relative rotation therebetween. The gear 99 is mounted in meshing engagement with a threaded portion 101 of the shaft 27 for rotation of the disk 25.

The coupling mechanism further includes a pair of pawl and ratchet wheel assemblies 103 and 105 which are actuable in response to rotation of the gear 99. The assemblies 103 and 105 are arranged such that for rotation of the gear 99 in the direction indicated by the arrow 107 of Fig. 6, the assembly 103 is effective to rotate the shaft 83 in the direction of the arrow 95 of Fig. 2 whereas the assembly 105 is ineffective to rotate the shaft 83. For rotation of the gear 99 in the direction of the arrow 109 of Fig. 6, the assembly 105 is effective to rotate the shaft 83 through a suitable transfer mechanism 111 described hereinafter in the direction of the arrow 95 whereas the assembly 103 is ineffective to rotate the shaft 83.

For such purpose the assembly 103 includes a pawl member 113 and a ratchet wheel 115 constructed and arranged relative to each other as best shown in Figs. 4 and 6. According to the present invention the pawl 113 includes an end portion 119 with a control element 121 connected to the pawl 113. The control element 121 is preferably in the form of an integral end portion of the pawl 113 which is spaced from the end portion 119 by a central portion 122 of the pawl. As shown in Fig. 4, the pawl 113 is preferably of substantially C-shaped configuration with the end portions 119 and 121 lying in a common plane.

The pawl 113 is preferably mounted for rotation in accordance with rotation of the gear 99 about the axis of the shaft 83. To this end the pawl 113 is supported by a pin 123 which extends through the portion 122 of the pawl 113, a plate 125 at one side of the gear 99, a hub portion of the gear 99 and a plate 126 at the other side of the gear 99. The pin 123 extends along an axis which is spaced from and parallel to the axis of the shaft 83 to mount the pawl 113 for pivotal movement about the axis of the pin 123.

The ratchet wheel 115 may be of any suitable construction. As illustrated in Fig. 4 the wheel 115 is provided with four spaced teeth 127, 129, 131 and 133 which are inclined in a common circumferential direction to provide respectively slots 127a, 129a, 131a and 133a. The wheel 115 is fixed to the shaft 83 in a plane common to the plane of the end portions of the pawl 113 for rotation with the shaft 83.

It is observed that the pin 123 mounts the pawl 113 such that each of the end portions 119 and 121 extends toward the wheel 115 free for engagement with the several teeth of the wheel 115. In order to permit relative rotation between the pawl 113 and the wheel 115 as described hereinafter the pawl 113 and the wheel 115 are mounted so that one of the end portions 119 and 121 is positioned to clear the several teeth of the wheel 115 when the other of the end portions 119 and 121 extends into the space between adjacent teeth of the wheel 115. Furthermore, the end portions 119 and 121 are spaced by a distance which is greater than the distance by which adjacent teeth of the wheel 115 are spaced. In addition, the pawl 113 and wheel 115 are arranged such that the teeth of the wheel 115 clear the central portion 122 of the pawl 113 during relative rotation between the pawl and wheel.

The assembly 103 is arranged such that for rotation of the gear 99 in the direction of the arrow 107, one or the other of the end portions 119 and 121 of the pawl 113 will assume a position within one of the several slots of the ratchet wheel 115 depending upon the relative positions of the pawl and ratchet wheel at the initiation of such rotation of the gear 99. As shown in Fig. 4, the end portion 121 is positioned within the slot 131a to drivingly engage the tooth 131 for effecting rotation of the ratchet wheel 115 and, consequently, the shaft 83 in the direction of the arrow 107 in response to rotation of the gear 99 in such direction. It is observed, however, that the pawl 113 may be pivoted about the axis of the pin 123 from the position illustrated in Fig. 4 to a position wherein the end portion 119 is located in one of the several slots of the ratchet wheel 115 to drivingly engage the associated ratchet tooth. For this condition, rotation of the gear 99 in the direction of the arrow 107 will also result in rotation of the shaft in such direction. As will presently appear, the assembly 103 is ineffective to rotate the shaft 83 in response to rotation of the gear 99 in the direction of the arrow 109 of Fig. 6.

The assembly 105 is provided for the purpose of effecting rotation of the shaft 83 in the direction of the arrow 95 of Fig. 2 in response to rotation of the gear 99 in the direction indicated by the arrow 109 of Fig. 6. To this end, the assembly 105 includes a pawl 135 and a ratchet wheel 137, details of construction of which are illustrated in Fig. 5. As there shown, the pawl 135 is of identical construction to the pawl 113 having similarly a pair of end portions 141 and 143 lying in a common plane connected by a central portion 144. The pawl 135 is supported by a pin 145 which projects through the portion 144 of the pawl 135, the plate 126, the hub portion of the gear 99 and the plate 125 along an axis which is spaced from and parallel to the axis of the shaft 83. The pin 145 further mounts the pawl 135 for pivotal movement about the axis of the pin 145. It is observed, with reference to Figs. 4 and 5, that the pawls 113 and 135 are supported at opposing sides of the axis of the shaft 83 for the purpose of providing a balanced assembly.

The ratchet wheel 137 is loosely carried by the shaft 83 in a plane which is common to the plane of the end portions of the pawl 135 to permit relative rotation between the ratchet wheel 137 and the shaft 83. The ratchet wheel 137 is similar in construction to the ratchet wheel 115, having a plurality of teeth 147, 149, 151 and 153 inclined in a common circumferential direction to provide respectively slots 147a, 149a, 151a and 153a.

The assembly 105 is arranged such that for rotation of the gear 99 in the direction of the arrow 109 of Fig. 6, one or the other of the end portions 141 and 143 will assume a position in one of the slots of the ratchet wheel 137 to drivingly engage the associated ratchet tooth for rotating the ratchet wheel 137 in the direction of the arrow 109. In order to transfer such rotation of the ratchet wheel 137 to the shaft 83 for rotating the shaft 83 in the direction of the arrow 95, the ratchet wheel 137 is coupled to the shaft 83 through a suitable transfer mechanism 111. As best shown in Fig. 6, the mechanism 111 includes a gear 155 which is secured to the ratchet wheel 137 for rotation therewith. The gear 155 is provided with a hub 157 which engages a stop 159 fixed to the shaft 83. The gear 155 is mounted in meshing engagement with a suitable crown gear 161 which is mounted by the plate 47 for rotation about an axis extending transverse to the shaft 83. The gear 161 is in meshing engagement with a gear 163 which is fixed to the shaft 83.

The operation of the coupling mechanism 97 may now be described. Let it be assumed that the gear 99 is rotating in the direction of the arrow 107. For this condition, the pawl 113 drivingly engages the ratchet wheel 115 to rotate the ratchet wheel 115 and the shaft 83 in the direction indicated by the arrow 107. This causes rotation of the gear 163 in the direction of the arrow 107 which results in rotation of the gear 155 and the ratchet wheel 137 in the direction of the arrow 109 through the crown gear 161. Since the pawl 135 is secured to the gear 99 it will rotate in the direction of the arrow 107 for the assumed condition. As a result of such relative rotation between the pawl 135 and the ratchet wheel 137 each of the end portions 141 and 143 of the pawl 135 slides over the inclined teeth of the ratchet wheel 137 without assuming a driving position within a ratchet slot whereby the pawl 135 oscillates slightly about the axis of the pin 145.

With such arrangement it is observed that very little friction is developed between the pawl 135 and ratchet wheel 137 during such relative rotation thereof. Consequently, a negligible burden is imposed upon the shaft 27 during rotation of the gear 99 in the direction of the arrow 107.

Let is be assumed now that rotation of the gear 99 is in the direction of the arrow 109. Then for this condition the pawl 135 drivingly engages the ratchet wheel 137 to rotate the ratchet wheel 137 and the gear 155 in the direction of the arrow 109. This results in rotation of the crown gear 161 in the direction of the arrow 165 of Fig. 6 to effect rotation of the gear 163, the shaft 83 and the ratchet wheel 115 in the direction of the arrow 107. Inasmuch as the pawl 113 is secured to the gear 99 it will rotate in the direction of the arrow 109 for the assumed condition. As a consequence of the resulting relative rotation between the pawl 113 and the ratchet wheel 115 each of the end portions 119 and 121 of the pawl 113 slides over the teeth of the ratchet wheel 115 without assuming a driving position in one of the ratchet slots whereby the pawl 113 oscillates slightly about the axis of the pin 123. Such oscillatory movement results in the development of very little friction between the pawl 113 and ratchet wheel 115 during rotation of the gear in the direction of the arrow 109. As a consequence a negligible burden is imposed upon the shaft 27 for the assumed condition.

It is observed that by means of the invention the coupling mechanism 97 prevents a false registration of the register device 35 in the event of rotation of the disk 25 in a direction opposite to the normal direction of rotation thereof. Furthermore, the coupling mechanism is arranged such that a negligible burden is imposed upon the shaft 27 during rotation of the disk in either direction. The coupling mechanism is also formed of a minimum number of parts which results in an inexpensive and simple mechanism.

Although the invention has been described with reference to certain specific embodiments thereof, numerous modifications are possible and it is desired to cover all modifications falling within the spirit and scope of the invention.

I claim as my invention:

1. In a watthour meter, an electromagnetic structure effective when energized for producing a shifting magnetic field, a driving shaft mounted for rotation about a first axis relative to said structure, an electroconductive armature supported by said driving shaft for rotation relative to said structure about said first axis under the influence of said shifting field, a register device actuable for providing an indication of the number of revolutions of said armature, a driven shaft mounted for rotation in a first direction about a second axis for actuating said register device, a pair of pawl and ratchet wheel assemblies, one of said ratchet wheels being loosely mounted on said driven shaft with its teeth inclined in a first direction about said second axis, the other of said ratchet wheels being fixed to said driven shaft for rotation therewith with its teeth inclined in a second direction opposite to the first direction about said second axis, each of said pawls having a pair of spaced end portions, a first means driven by said driving shaft and rotatably supported on said driven shaft, second means mounting said pawls on said first means for rotation about said second axis in a common direction according to the direction of rotation of said driving shaft, said second means further mounting said pawls for pivotal movement about spaced parallel third axes spaced from and parallel to said second axis with the associated end portions extending toward the cooperating ratchet wheel for engagement therewith, said pawls being proportioned such that upon rotation of said pawls by said first means in a first direction one or the other of said end portions of the one of said pawls which cooperates with said fixed ratchet wheel drivingly engages a tooth of said fixed wheel to rotate said fixed wheel in its said first direction and said driven shaft in its said first direction while each of the end portions of the other of said pawls which cooperates with said loose ratchet wheel slidably engages the inclined surfaces of said teeth of said loose wheel to effect oscillation of said other pawl about its third axis, said pawls further being proportioned such that upon rotation of said pawls by said first means in a second direction one or the other of said end portions of said other pawl drivingly engages a tooth of said loose wheel to rotate said loose wheel in its said second direction while each of said end portions of said one pawl slidably engages the inclined surfaces of said teeth of said fixed wheel to effect oscillation of said one pawl about its third axis, said pawls being movable in said first and second directions solely by said teeth of the one of said pawls with which it cooperates, and transfer gearing coupling said loose wheel to said driven shaft and effective in response to rotation of said pawls in their said second direction to rotate said driven shaft in its said first direction for actuation of said register.

2. In a watthour meter, an electromagnetic structure effective when energized for producing a shifting magnetic field, a driving shaft mounted for rotation about a first axis relative to said structure, an electroconductive armature supported by said driving shaft for rotation relative to said structure about said first axis under the influence of said shifting field, a register device actuable to provide an indication of the number of revolutions of said armature, a driven shaft mounted for rotation in a first direction about a second axis for actuating said register device, a gear loosely carried by said driven shaft in meshing engagement with said driving shaft for rotation about said second axis in accordance with the direction of rotation of said driving shaft, a pair of ratchet wheels, one of said ratchet wheels being loosely mounted on said driven shaft at one side of said gear with its teeth inclined in a first direction about said second axis, the other of said ratchet wheels being fixed to said driven shaft at the other side of said gear, with its teeth inclined in a second direction opposite to said first direction about said second axis, a pair of pawls each having a pair of spaced end portions, said pawls being carried by said gear on opposite sides thereof each for cooperation with a separate ratchet wheel, said pawls being mounted for pivotal movement about spaced third axes spaced from and parallel to said second axis with the associated end portions extending toward the cooperating ratchet wheel for engagement therewith, said second axis being positioned between said third axes in a plane which includes said third axes, said pawls being proportioned such that upon rotation of said gear in a first direction one or the other of said end portions of the one of said pawls which cooperates with said fixed ratchet wheel drivingly engages a tooth of said fixed wheel to rotate said fixed wheel in its said first direction and said driven shaft in its said first direction while each of the end portions of the other of said pawls which cooperates with said loose ratchet wheel slidably engages the inclined surfaces of said teeth of said loose wheel to effect oscillation of said other pawl about its third axis, said pawls further being proportioned such that upon rotation of said gear in its said second direction one or the other of said end portions of said other pawl drivingly engages a tooth of said loose wheel to rotate said loose wheel in said second direction while each of said end portions of said one pawl slidably engages the inclined surfaces of said teeth of said fixed wheel to effect oscillation of said one pawl about its third axis, said pawls being movable in said first and second directions solely by said teeth of the one of said pawls with which it cooperates, and transfer gearing coupling said loose wheel and said driven shaft and effective in response to rotation of said gear in its said second direction to rotate said driven shaft in its said first direction.

3. In a watthour meter, an electromagnetic structure effective when energized for producing a shifting magnetic field, a driving shaft mounted for rotation about a first axis relative to said structure, an electroconductive armature supported by said driving shaft for rotation relative to said structure about said first axis under the influence of said shifting field, a register device actuable to provide an indication of the number of revolutions of said armature, a driven shaft mounted for rotation about a second axis for actuating said register device, a first gear loosely carried by said driven shaft in meshing engagement with said driving shaft for rotation about said second axis in accordance with the direction of rotation of said driving shaft, a pair of ratchet wheels, one of said ratchet wheels being loosely mounted by said driven shaft at one side of said first gear with its teeth inclined in a first direction about said second axis, the other of said ratchet wheels being fixed to said driven shaft at the other side of said first gear with its teeth inclined in a second direction opposite to the first direction about said second axis, a pair of pawls each having a pair of spaced end portions, said pawls being carried by said first gear at opposing sides thereof each for cooperation with a separate ratchet wheel, said pawls being mounted for pivotal movement about spaced third axes spaced from and parallel to said second axis with the associated end portions extending toward the cooperating ratchet wheel for engagement therewith, said second axis being positioned between said third axes in a plane which includes said third axes, said pawls being proportioned such that for rotation of the first gear in said first direction one or the other of the end portions of the one pawl cooperating with the fixed ratchet wheel drivingly engages a tooth of the fixed wheel to rotate the fixed wheel in said first direction while each of the end portions of the other pawl cooperating with the loose ratchet wheel slidably engages the inclined surfaces of the teeth of the loose wheel to effect oscillation of said other pawl about its third axis, and for rotation of said first gear in said second direction one or the other of the end portions of said other pawl drivingly engages a tooth of the loose wheel to rotate the loose wheel in said second direction while each of the end portions of said one pawl slidably engages the inclined surfaces of the teeth of the fixed wheel to effect oscillation of said one pawl about its third axis, and transfer gearing coupling said loose wheel and said driven shaft effective in response to rotation of said first gear in said second direction for rotating said driven shaft in said first direction, said transfer gearing comprising a second gear rotatable with said loose ratchet wheel about said second axis, a third gear spaced from said second gear fixed to said driven shaft for rotation therewith, and a crown gear mounted in meshing engagement with said second and third gears for rotation about a fourth axis transverse to said first axis.

4. In a mechanical assembly, a driving shaft mounted for rotation about a first axis, a driven shaft mounted for rotation about a second axis, a pair of pawl and ratchet wheel assemblies, one of said ratchet wheels being loosely mounted by said driven shaft with its teeth inclined in a first direction about the second axis, the other of said ratchet wheels being fixed to said driven shaft for rotation therewith with its teeth inclined in a second direction opposite to the first direction about the second axis, gear means loosely supported by said driven shaft in meshing engagement with said driving shaft mounting said pawls for rotation about said second axis in a common direction according to the direction of rotation of said driving shaft, said pawls being mounted such that for rotation of the pawls in said first direction about said second axis an end of one pawl drivingly engages a tooth of the fixed wheel to rotate the fixed wheel in said first direction while an end of the other pawl slidably engages the inclined surfaces of the teeth of the loose wheel, and for rotation of the pawls in said second direction an end of the other pawl drivingly engages a tooth of the loose wheel to rotate the loose wheel in said second direction while said one pawl slidably engages the inclined surfaces of the teeth of the fixed wheel, and transfer gearing coupling said loose wheel and said driven shaft effective in response to rotation of said pawls in said second direction for rotating said driven shaft in said first direction, said transfer gearing comprising a first gear rotatable with said loose ratchet wheel about said second axis, a second gear spaced from said first gear fixed to said driven shaft for rotation therewith, and a crown gear mounted in meshing engagement with said first and second gears for rotation about an axis transverse to said second axis.

5. In watthour meter, an electromagnetic structure effective when energized for producing a shifting magnetic field, a driving shaft mounted for rotation about a first axis relative to said structure, an electroconductive armature supported by said driving shaft for rotation relative to said structure about said first axis under the influence of said shifting field, a register device actuable for providing an indication of the number of revolutions of said armature, a driven shaft mounted for rotation in a first direction about a second axis for actuating said register device, a pair of pawl and ratchet wheel assemblies, one of said ratchet wheels being loosely mounted on said driven shaft with its teeth inclined in a first direction about said second axis, the other of said ratchet wheels being fixed to said driven shaft for rotation therewith with its teeth inclined in a second direction opposite to the first direction about said second axis, each of said pawls having a pair of spaced end portions, a first means driven by said driving shaft and rotatably supported on said driven shaft, second means mounting said pawls on said first means for rotation about said second axis in a common direction according to the direction of rotation of said driving shaft, said second means further mounting said pawls for pivotal movement about spaced parallel third axes spaced from and parallel to said second axis with the associated end portions extending toward the cooperating ratchet wheel for engagement therewith, said pawls being proportioned such that upon rotation of said pawls by said first means in a first direction one or the other of said end portions of the one of said pawls which cooperates with said fixed ratchet wheel drivingly engages a tooth of said fixed wheel to rotate said fixed wheel in its said first direction and said driven shaft in its said first direction while each of the end portions of the other of said pawls which cooperates with said loose ratchet wheel slidably engages the inclined surfaces of said teeth of said loose wheel to effect oscillation of said other pawl about its third axis, said pawls further being proportioned such that upon rotation of said pawls by said first means in a second direction one or the other of said end portions of said other pawl drivingly engages a tooth of said loose wheel to rotate said loose wheel in its said second direction while each of said end portions of said one pawl slidably engages the inclined surfaces of said teeth of said fixed wheel to effect oscillation of said one pawl about its third axis, and transfer gearing coupling said loose wheel to said driven shaft and effective in response to rotation of said pawls in their said second direction to rotate said driven shaft in its said first direction for actuation of said register, said pawls being movable in said first and second directions solely by said teeth of the one of said pawls with which it cooperates, said transfer gearing comprising a first gear rotatable by said loose ratchet wheel about said second axis, a second gear spaced from said first gear fixed to said driven shaft for rotation therewith, and a crown gear mounted in meshing engagement with said first and second gears for rotation about a fourth axis transverse to said second axis.

References Cited in the file of this patent

UNITED STATES PATENTS

| | | |
|---|---|---|
| 353,797 | Marshall | Dec. 7, 1886 |
| 599,508 | Fevre | Feb. 22, 1898 |
| 630,840 | Aron | Aug. 15, 1899 |
| 637,766 | Creveling | Nov. 28, 1899 |
| 940,638 | Hintze | Nov. 16, 1909 |
| 1,202,788 | Bradshaw | Oct. 31, 1916 |